2,889,246
Patented June 2, 1959

2,889,246

METHOD OF REPELLING RODENTS BY TREATING WITH A COMPOSITION COMPRISING AN ARYL NITROOLEFIN

Robert J. Harker, Terre Haute, Ind., assignor to Commercial Solvents Corporation, Terre Haute, Ind., a corporation of Maryland No Drawing. Application March 13, 1957
Serial No. 645,657

6 Claims. (Cl. 167—46)

My invention relates to rodent repellent compositions. More particularly it relates to rodent repellent compositions containing certain nitroolefins as the essential active ingredient.

This application is a continuation-in-part of my prior application Serial No. 403,623, filed January 12, 1954, now abandoned.

For many years a need has been felt for compositions which would protect food and other materials in storage from attacks by rats and mice. The losses in food and clothing stored for long periods in warehouses where it is possible for rats and mice to attack the containers are quite extensive. Particularly is this true when food must be stored in temporary dumps, as is the case in military operations. However, even in well-constructed warehouses losses of materials packed in paperboard or fiberboard cartons and paper or fiber bags are great due to rodent damage. To completely prevent such losses, food and clothing must be packed in wooden or tinplate containers and this solution is very expensive. Attempts to develop compositions suitable for impregnating or surface treating paperboard, fiberboard, and paper and fiber bags to render these packaging materials repellent to rodents have not been successful.

I have now found that effective rodent repellent compositions can be produced which contain as the essential repellent material an aryl nitroolefin having the formula

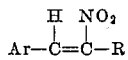

wherein Ar is a radical selected from the group consisting of phenyl, chlorophenyl, hydroxyphenyl, tolyl and 2-furyl and R is selected from the group consisting of hydrogen, methyl, ethyl, propyl, and bromine, Ar being phenyl only when R is ethyl or propyl.

The aryl nitroolefins suitable for use in my new rodent repellent composition include phenyl nitroolefins such as: 2-nitro-1-phenyl-1-butene and 2-nitro-1-phenyl-1-pentene, the substituted phenyl nitroolefins such as: 2-nitro-1-p-tolyl-1-propene, 2-nitro-1-p-tolyl-1-butene, 2-nitro-1-o-chlorophenyl-1-propene, 2-nitro-1-o-chlorophenyl-1-butene, 2-nitro-1-(p-hydroxyphenyl)-1-propene, 2-nitro-1-(p-hydroxyphenyl)-1-butene, 2-nitro-1-(2,4-dichlorophenyl)-1-propene, and 2-nitro-1-(2,4-dichlorophenyl)-1-butene, the furyl nitroolefins such as: 2-nitro-1-furylethylene, 2-nitro-1-furyl-1-propene, and 2-nitro-1-furyl-1-butene, and the bromine substituted aryl nitroethylenes such as: 2-nitro-2-bromo-1-furylethylene, 2-nitro-2-bromo-1-phenylethylene, 2-nitro-2-bromo-1-p-tolylethylene, 2-nitro-2-bromo-1-o-chlorophenylethylene, 2-nitro-2-bromo-1-p-hydroxyphenylethylene, and 2-nitro-2-bromo-1-(2,4-dichlorophenyl)ethylene.

The aryl nitroolefins useful in my new compositions can be produced by reacting the desired aromatic aldehyde with from an equimolar to a 50% molar excess of the desired primary nitroparaffin in from 0.5 to 4 volumes of a low boiling inert solvent, such as benzene, petroleum hexane, etc., and in the presence of from 0.01 to 0.1 mole of a primary amine acetate, such as isopropylammonium acetate, n-butylammonium acetate, etc., per mole of aromatic aldehyde. The reaction can be conducted in a reaction vessel equipped with a distillation head, a reflux column, and an upper layer return decanter. The course of the reaction can be followed by the amount of water formed and removed from the reaction, one mole of water being produced per mole of aromatic aldehyde reacted. After the reaction is completed the solvent can be evaporated and the product purified, if a liquid, by vacuum fractionation, and, if a solid, by recrystallization from a low molecular weight alcohol or acetone.

Thus, the 2-nitro-1-phenyl-1-butene and 2-nitro-1-phenyl-1-pentene can be produced by reacting benzaldehyde with 1-nitropropane and 1-nitrobutane respectively by the procedure set forth above. Similarly, the 2-nitro-1-p-tolylethylene, 2-nitro-1-p-tolyl-1-propene and 2-nitro-1-p-tolyl-1-butene can be produced by reacting p-toluic aldehyde with nitromethane, nitroethane, and 1-nitropropane respectively; the 2-nitro-1-o-chlorophenylethylene, 2-nitro-1-o-chlorophenyl-1-propene, and 2-nitro-1-o-chlorophenyl-1-butene can be produced by reacting o-chlorobenzaldehyde with nitromethane, nitroethane, and 1-nitropropane respectively; the 2-nitro-1-p-hydroxyphenylethylene, 2-nitro-1-p-hydroxyphenyl-1-propene, and 2-nitro-1-p-hydroxyphenyl-butene, can be produced by reacting p-hydroxybenzaldehyde with nitromethane, nitroethane, and 1-nitropropane respectively; the 2-nitro-1-(2,4-dichlorophenyl)ethylene, 2-nitro - 1 - (2,4-dichlorophenyl)-1-propene, and 2-nitro-1-(2,4-dichlorophenyl)-1-butene can be produced by reacting 2,4-dichlorobenzaldehyde with nitromethane, nitroethane, and 1-nitropropane respectively. The 2-nitro-1-furylethylene, 2-nitro-1-furyl-1-propene, 2-nitro-1-furyl-1-butene, and 2-nitro-1-furyl-1-pentene can be produced by reacting furfural with nitromethane, nitroethane, 1-nitropropane, and 1-nitrobutane respectively using the procedure set forth above.

The bromine substituted arylnitroethylenes such as 2-nitro-2-bromo-1-furylethylene, 2-nitro-2-bromo-1-phenylethylene, 2-nitro-2-bromo-1-p-tolylethylene, 2-nitro-2-bromo-1-o-chlorophenylethylene, 2-nitro-2-bromo-1-p-hydroxyphenylethylene, and 2-nitro-2-bromo-1-(2,4-dichlorophenyl)ethylene, can be produced by reacting respectively furfural, benzaldehyde, p-toluic aldehyde, o-chlorobenzaldehyde, p-hydroxybenzaldehyde, and 2,4-dichlorobenzaldehyde with bromonitromethane by the procedure set forth above.

My new rodent repellent compositions preferably include an inert carrier for the active rodent repellent material. Thus I can combine my rodent repellent material with an inert organic solvent carrier. Inert organic solvents suitable for this purpose include benzene, toluene, xylene, petroleum hexane, chlorinated biphenyls, and chlorinated polyphenyls. I can also combine my new rodent repellent material with an inert solid carrier which will form a paste with water which can be applied to a surface, the paste remaining as a solid, dry film when the water has evaporated. Inert solids suitable as carriers which can be made up as water pastes include starch, wheat flour, soya flour, etc. This latter type of carrier is particularly well adapted to use with those active repellent materials which are solids at normal temperatures.

My new rodent repellents can be employed, with any preferred solvent or carrier or alone if desired, in any desired manner so long as the repellent is so placed, with respect to the articles to be protected, that the rodent must approach the repellent in order to attack the articles. In other words a barrier of repellency interrupts the access of the rodent to the articles protected.

Thus the repellent can be placed or applied in any convenient manner so long as the repellent is always between the protected article and the possible avenues of approach of rodents. For example, the repellent composition can be applied to the lower edges of a tent erected over a storage dump to be protected or the repellent composition can be sprayed on the ground around the area in which articles are stored. The rodent repellent can be applied to the walls of warehouses, temporary or permanent, or to actual container surfaces, the principle in each instance being the same, i.e. in order for a rodent to attack a protected article, it must approach the repellent and contact it in order to get to the protected article and since the rodent will not contact the repellent it will no be able to attack the protected article.

The following example illustrates the efficacy of my invention in repelling rodents. I do not intend to be limited to the particular compound or compositions described, but the scope of my invention is as set forth in this specification and the appended claims.

The active rodent repellent materials of my new compositions have been tested for rodent repellency according to the method described in "Rodent Repellent Studies. Development of an Index Number for Expressing Degrees of Repellent Activity," by E. Bellack and J. B. De Witt, published in the Journal of the American Pharmaceutical Association (Scientific Edition), vol. 38 (2), at pages 109 to 112 in February 1949. Individually caged laboratory rats were given two food cups, one containing 20 grams of a standard laboratory diet, and the other containing similar food to which the test material had been added in an amount equal to 0.5%, 1.0%, or 2.0% of the total weight of twenty grams. Water was supplied ad libitum, and food consumption was determined daily during the test period of four days. The degree of repellency of the test material, expressed as the repellency index number K, was calculated by the formula:

$$K = 100 - 1/100W(8T_1 + 4T_2 + 2T_3 + T_4)(U_1 + U_2 + 2U_3 + 4U_4 + 8X)$$

where W equals the body weight of the rat in kilograms, $T_1$, $T_2$, $T_3$ and $T_4$ represent the consumption in grams of the treated food on the first through the fourth day, $U_1$, $U_2$, $U_3$, and $U_4$ represent the consumption of the untreated food, and X represents the residue of untreated food at the conclusion of the experiment. K equals 100 when the rat ate none of the treated food. The results of these tests are summarized in Table I below.

Table I

| Compound | Melting Point, °C. | Boiling Range, °C. | Repellency Index at Conc. of— | | |
|---|---|---|---|---|---|
| | | | 2% | 1% | 0.5% |
| 2-Nitro-1-phenyl-1-butene | | 155–160, 25 mm | 98.5 | 85.7 | 84.8 |
| 2-Nitro-1-phenyl-1-pentene | | 115–118, 2 mm | 100 | 91.6 | 88.8 |
| 2-Nitro-1-p-tolyl-1-propene | | 110–112, 1 mm | 100 | 99.8 | 97.6 |
| 2-Nitro-1-p-hydroxyphenyl-1-propene | 87–90 | | 98.9 | | |
| 2-Nitro-1-o-chlorophenyl-1-butene | 36–37 | | 100 | 100 | 99.9 |
| 2-Nitro-1-(2,4-dichlorophenyl)-1-butene | | 121–126, 18 mm | 98.1 | 92.0 | 96.2 |
| 2-Nitro-1-furylethylene | 75–76 | | 100 | 99.2 | 99.2 |
| 2-Nitro-1-furyl-1-butene | | 94–96, 2 mm | 100 | 96.0 | 93.4 |
| 2-Nitro-2-bromo-1-furylethylene | 57–58 | | 100 | 97.2 | 98.4 |

Now having described my invention, what I claim is:

1. A process for protecting, against rodents, articles exposed to attack by rodents which comprises effectively surrounding said articles with, as a repellent barrier, a composition containing at least 0.5% of a nitroolefin having the following structural formula:

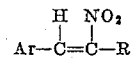

wherein Ar is a radical selected from the group consisting of phenyl, chlorophenyl, hydroxyphenyl, tolyl and 2-furyl; and R is selected from the group consisting of hydrogen, methyl, ethyl, propyl and bromine, Ar being phenyl only when R is ethyl or propyl.

2. The process of claim 1 wherein the nitroolefin is 2-nitro-1-furylethylene.

3. The process of claim 1 wherein the nitroolefin is 2-nitro-2-bromo-1-furylethylene.

4. The process of claim 1, wherein the nitroolefin is 2-nitro-1-o-chlorophenyl-1-butene.

5. The process of claim 1 wherein the nitroolefin is 2-nitro-1-p-tolyl-1-propene.

6. The process of claim 1 wherein the nitroolefin is 2-nitro-1-furyl-1-butene.

References Cited in the file of this patent

UNITED STATES PATENTS 2,335,384     Bousquet     Nov. 30, 1943

OTHER REFERENCES

Bellack et al.: Relationship Between Chemical Structure and Rat Repellency, Nat. Res. Council Rev. No. 5, May 1953, pp. 48–49 and 125.